J. W. WALKER.
ENGAGING AND DISENGAGING GEAR FOR ATTACHING AND LIBERATING BOATS AND FOR OTHER PURPOSES.
APPLICATION FILED JUNE 10, 1911.
1,010,708.
Patented Dec. 5, 1911.
2 SHEETS—SHEET 1.
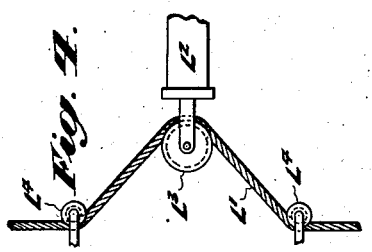
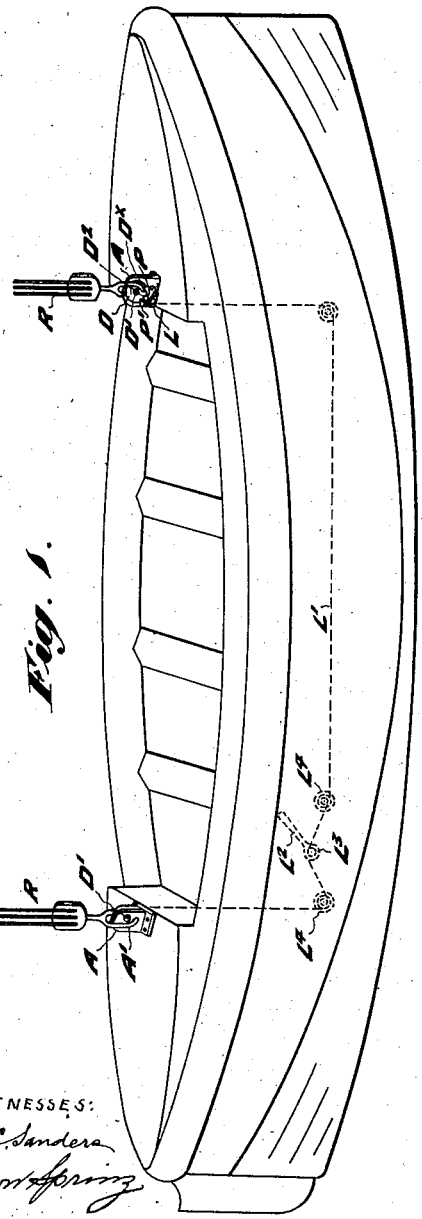
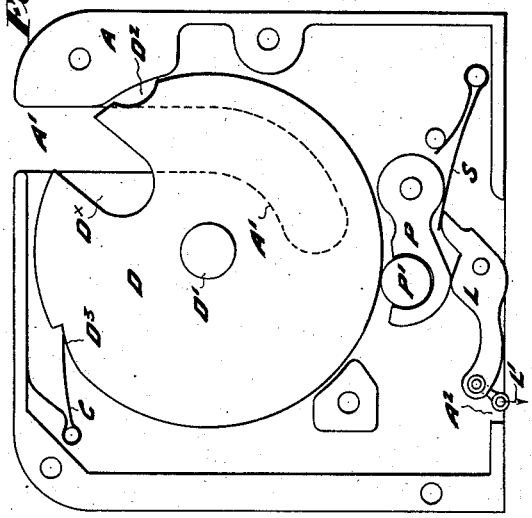
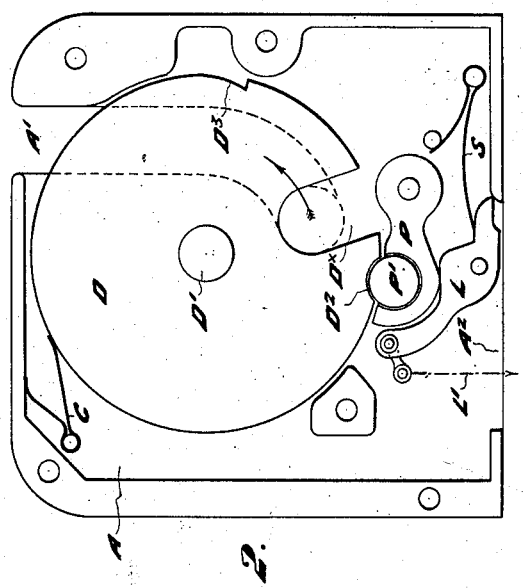
WITNESSES:
INVENTOR:
John William Walker J. W. WALKER.
ENGAGING AND DISENGAGING GEAR FOR ATTACHING AND LIBERATING BOATS AND FOR OTHER PURPOSES.
APPLICATION FILED JUNE 10, 1911.
1,010,708.
Patented Dec. 5, 1911.
2 SHEETS—SHEET 2.
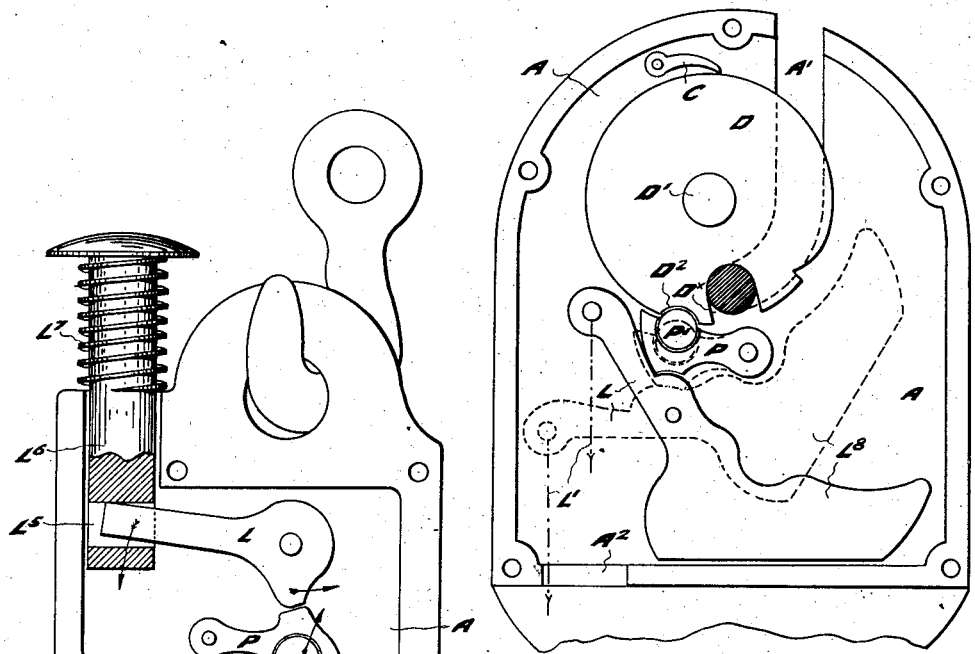
*Fig. 6.*
*Fig. 5.*
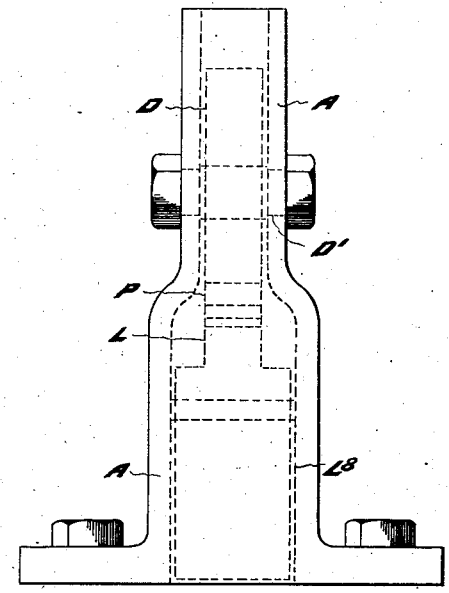
*Fig. 7.*
WITNESSES:
John C. Sanders
Leon Herring
INVENTOR:
John William Walker
BY
ATTY.

UNITED STATES PATENT OFFICE.

JOHN WILLIAM WALKER, OF BRADFORD, ENGLAND.

ENGAGING AND DISENGAGING GEAR FOR ATTACHING AND LIBERATING BOATS AND FOR OTHER PURPOSES.

1,010,708. Specification of Letters Patent. Patented Dec. 5, 1911.

Application filed June 10, 1911. Serial No. 632,339.

*To all whom it may concern:*

Be it known that I, JOHN WILLIAM WALKER, resident of 24 Southey Place, Hill Side Villas, Bradford, in the county of York, wool-merchant, subject of the King of Great Britain and Ireland, have invented new and useful Improvements in Engaging and Disengaging Gear for Attaching and Liberating Boats and for other Purposes, of which the following is a specification.

This invention relates to improvements in locking and releasing gear, to be used in liberating boats from the davits of a ship or the like, releasing a load from a crane, for connecting up chains, ropes or the like which require to be quickly disconnected at will, for tipping trucks or the like, for releasing springs, valves or the like and as an automatic coupling and releasing gear for various purposes, such as may be employed for releasing aeroplanes, balloons or the like of that class in which revolving disks are employed carried in suitable bearings and provided with engaging notches into which the article to be held is placed and pressed home causing the disk to revolve until locking means engage the same, the side or the notch or like in the disk acting as a retaining means against the pull of the ring, bolt or like of the articles so held.

The locking means have usually comprised bolts actuated by springs to engage the locking aperture of the disk automatically or the locking means have been operated mechanically a stop or like being provided in connection with the disk to insure that same did not move too far. This arrangement naturally causes a large amount of friction between the disk and locking means and also renders the operation of release one of comparative great force, whereas the object of my invention is to construct a simple and efficient mechanism which will insure that the locking means ride easily and without undue friction on the disk during the locking or releasing movement and the pull off or release will be easy or light the pull of the article held insuring an instantaneous and automatic release.

In describing my invention in detail, reference is made to the accompanying sheets of drawings, similar letters indicating similar parts, in which—

Figure 1 represents a view of a boat showing my apparatus attached thereto, Figs. 2 and 3 represent views of the apparatus in the "engaged" and "releasing" positions respectively. Fig. 4 represents a detail hereinafter referred to, and Figs. 5–7 represent other forms or modifications of devices.

In carrying out my invention, I will describe the same as being applied to the liberating of lifeboats from the davits of a vessel, although it will be understood, that without departing from the nature of my invention the device is equally applicable for other purposes, types of which are hereinbefore enumerated.

The device comprises primarily a disk D mounted on a bearing D' as to be capable of revolution in any suitable frame such as two sheaths A, fitting together to inclose the mechanism (in the drawings, Figs. 2, 3, 5 and 6, the front sheath is removed). The disk is provided with what I might term as engaging slot $D^x$ and in the sheaths are formed slots A'. When the disk is in the engaged position, (Figs. 2 and 6) the ends of slots A' and the slot $D^x$ will coincide and form a hole or aperture through the device. In the disk D is formed a rounded or arc shaped recess $D^2$ with which, for locking purposes, engages a roller P' mounted on a pawl or like P. The pawl P is engaged by a lever L such lever being pressed by spring S to insure the engagement being made when the lever is released. The lever L is cut away to allow the pawl P to rest thereon in the locking position and a recess is also formed in the lever L to allow the pawl to drop into the freed position, the roller P' just resting clear of the disk or in contact therewith. The spring S however may be discarded when the device is required to be arranged vertically and permanently and the end of lever L weighted in lieu thereof. This arrangement is shown in Fig. 6 the lever L having a weighted extension $L^8$. An end view is shown in Fig. 7. To the lever L is attached the releasing cord, chain or like L', which passes through an opening $A^2$ in the sheaths. The disk D has a stop slot or notch $D^3$ formed therein to engage a spring, spring catch or gravity catch such as C arranged within the sheaths or casing in order to prevent the disk D from turning too far around, and to insure that the engaging slots $D^x$ and A' coincide to allow a rope, ring, bar or like to be readily admitted thereto, as is usual in devices of this nature. If a rope, chain, ring or like is held in the slots D× and A′ by the disk D as locked in Figs. 2 and 6 and the chain or like L′ is pulled against the pull of the spring or weight, the roller P′ on pawl P will fall away from D² and allow the pull of the rope or like required to be released and to revolve the disk D until the position in Fig. 3 is reached when the rope, ring or the like will be automatically freed.

It will be understood that the apparatus is arranged in connection with the tackle to be held and that there is normally a force acting tending to pull the two apart. As the roller P′ is pressing against the edge of disk D the lever L cannot return to its original position. If however a rope or the like is inserted in the slots A′ and D× and pressed down the mechanism will resume the position shown in Figs. 2 and 6 and the roller P′ will engage the recess D² and the rope will be automatically secured until again released.

In Fig. 1 two of the devices are shown attached to convenient portions of a life-boat or the like, R representing the fall ropes or the like. The releasing cord or like L′ of each device is connected for simultaneous release and by preference concealed or inclosed to prevent fouling or unauthorized tampering. On the cord is mounted in any suitable position a releasing handle L² (or a ring) which may carry a pulley L³ (Figs. 1 and 4) and the cord L′ will pass under fixed pulleys L⁴ arranged at either side of the handle L². A pull at the handle L² will insure both fall ropes, blocks, tackle or the like being released simultaneously. The reason such simultaneous release is necessary is on account of the fact that when the present ordinary rings, hooks or the like are used, the boat is required to rest in the water to relieve the load before the tackle can be released and it may often happen that the operator at one end is able to release one end on a wave crest, while the other end, still fast, is carried high above the water and thus the boat may be damaged or upset.

Instead of the apparatus being as it were "pulled off" for releasing purposes, the pawl P may be released by a push motion such as that shown in Fig. 5, wherein the lever L is engaged at one end by an aperture L⁵ in a push bar L⁶ provided with a spring L⁷ the arrows indicate the direction of travel, the movement being the same as that before described.

The forms of apparatus may, as will be understood, be modified and arranged to suit various requirements and the device may be used wherever automatic connecting and releasing means are required, such as in connection with tow ropes or chains, releasing weights from any given height for breaking metal, pile driving and the like, for the automatic coupling or slipping of a portion of a train and for couplings for various other purposes. The use of a notched disk combined with a coupling hook is not intended to be claimed *per se* as devices of this nature have heretofore been employed but the apparatus have not been self locking.

What I claim as my invention is:—

1. In an engaging and disengaging device, in combination, a rotatable disk provided with an article-engaging recess and a locking recess, a roller adapted to engage said locking recess to hold said disk in its operative position, a lever carrying said roller, and means normally holding the lever with the roller in operative engagement with said disk.

2. In an engaging and disengaging device, in combination, a rotatable disk provided with an article-engaging recess and a locking recess, a roller adapted to engage said locking recess to hold said disk in its operative position, a lever carrying said roller, means normally holding the lever with the roller in operative engagement with said disk, and means to render said last mentioned means inoperative, whereby said disk may be rotated to release the article which is held in the article-engaging recess.

3. In an engaging and disengaging device, in combination, a rotatable disk provided with an article-engaging recess and a locking recess, a roller adapted to engage said locking recess to hold said disk in its operative position, a lever carrying said roller, means normally holding the lever with the roller in operative engagement with said disk, means to render said last mentioned means inoperative, whereby said disk may be rotated to release the article which is held in the article-engaging recess, and means for arresting the rotation of the disk when the article is released.

In witness whereof, I have hereunto set my hand, in the presence of two witnesses.

JOHN WILLIAM WALKER.

Witnesses:
JOSEPH P. KIRBY,
JOHN J. BOTKRILL.

---

Copies of this patent may be obtained for five cents each, by addressing the "Commissioner of Patents, Washington, D. C."